United States Patent Office 3,773,928
Patented Nov. 20, 1973

3,773,928
TREATMENT OF VIRUS-INDUCED DISEASES WITH ORGOTEIN
Wolfgang Huber, San Francisco, and Thomas L. Schulte, Woodside, Calif., assignors to Diagnostic Data, Inc., Mountain View, Calif.
No Drawing. Continuation-in-part of application Ser. No. 3,517, Jan. 16, 1970, which is a continuation-in-part of application Ser. No. 576,454, Aug. 31, 1966, which in turn is a continuation-in-part of application Ser. No. 494,048, Oct. 8, 1965, all now abandoned. This application May 10, 1972, Ser. No. 252,094
Int. Cl. A61k 27/00
U.S. Cl. 424—177
18 Claims

ABSTRACT OF THE DISCLOSURE

A method of symptomatically treating a viral-induced disease in an animal which is suffering from the results of the viral infection, which comprises the systemic administration to the infected patient of successive therapeutically effective doses of orgotein. Viruses causing such orgotein-responsive reaction include adenovirus, herpesvirus, myxovirus, paramyxovirus, poxvirus, reovirus, picornavirus and arbovirus.

BACKGROUND OF THE INVENTION

This invention relates to a method for the treatment of virus-induced diseases in animals.

This application is a continuation-in-part of application Ser. No. 3,517 filed Jan. 16, 1970, now abandoned as a continuation-in-part of application Ser. No. 576,454, filed Aug. 31, 1966, now abandoned, as a continuation-in-part of application Ser. No. 494,048, filed Oct. 8, 1965, now abandoned.

The virus classes listed in Table I have been identified as resulting in at least the disease manifestations in humans and animals listed therein. The importance of the role of host reaction is indicated by the names of many of the diseases listed, i.e., the diseases often are called by the name of host reaction rather than the virus causing it.

TABLE I

| Virus | Disease |
|---|---|
| Picorna | Poliomyelitis urethro-cystitis (cats) Laryngo-trachitis (cats) |
| Adenovirus | Infectious canine hepatitis. Kennel cough (bronchotracheitis). Bovine virus, types 1, 2, 3 infections. Pharyngitis. Follicular conjunctivitis. Kerato conjunctivitis. |
| Herpesvirus | Chicken pox. Marmoset virus disease. Rhinopneumonitis. Equine abortion. Lumpy skin virus. Herpes simples infections (keratitis and stomatitis). Varicella-zoster. Mononucleosis. |
| Poxvirus | Pox diseases, e.g., avian, goat, sheep, swine and cow pox. Variola, vaccina, bovine. Papular stomatitis. Contagious pustular dermatitis. Milker's nodules. Rabbit and squirrel myxoma and fibroma. |
| Myxovirus [1] | Influenza, types A, $A_1$, $A_2$ (Asian), B, C, infections (myositis, tendonitis, pneumorhinitis, enteritis). |
| Paramyxovirus [2] | Canine distemper. Newcastle disease. Mumps (orchitis, otitis, encephalitis, pavotiditis). Measles. Rinderpest. |
| Reovirus | Pneumorhinitis and enteritis in humans, mice and cattle. |
| Arbovirus | Encephalitis. |
| Papovavirus | Warts. |

[1] Myxo type II.
[2] Myxo type I.

These classes of viruses have the physical and chemical characteristics shown in Table II. See J. Melnick & R. McCombs, "Classification & Nomenclature of Animal Virus," Progr. Med. Virol., vol. 8, 400–409 (1966).

TABLE II.—VIRUS GROUPS INFECTING MAN AND ANIMALS—MAJOR PROPERTIES

| | Nucleocapsid | | Virion | | |
|---|---|---|---|---|---|
| Vernacular name of family | Type | Capsid symmetry | Naked (N) or enveloped (E) | Diameter or other measurement (mµ) | Site of replication |
| Adenovirus | DNA | Cubic | N | 70–80 | Nucleus. |
| Herpesvirus | DNA | do | E | 110–180 | Do. |
| Poxvirus | DNA | Helical | E | 200–300 | Cytoplsm. |
| Papovavirus | DNA | Icosahedral | N | 40–50 | Nucleus. |
| Myxovirus | RNA | Helical | E | 80–200 | Nucleus and cytoplasm. |
| Paramyxovirus | RNA | do | E | 100–300 | Cytoplasm and nucleus. |
| Picorna | RNA | Icosahedral | N | 20–30 | Cytoplasm. |
| Reovirus | RNA | Cubic | N | 70–75 | Do. |
| Arbovirus | RNA | Various | E | 20–50 | Do. |

Prophylaxis by either active or passive immunization has long been used to prevent the host animal from contracting the viral disease from which the immunizing drug was prepared. In addition, prophylaxis specific to myxoviruses has been reported for amantidine HCl. Immunizations are totally ineffective for an animal already infected with a virus, as is amantidine therapy. Indeed, once the animal has contracted a viral disease, very little can be done to systemically treat the disease. Supportive therapy, including antibiotics, antihistamines and bronchoactive and vasoactive substances is customarily administered to prevent or combat secondary infections of a bacterial origin that aften attack the animal in its infected state. Such secondary infections are most threatening when body cavities are occluded by inflammatory processes, e.g., otitis media following occlusion of the eustachian tube or bacterial pneumonia following viral bronchitis and in sinusitis.

Anti-viral agents which are truly viral specific, i.e., effective against virus replication, also harm host cells. Such agents include the nucleoside analogs iododeoxyuridine and cytosine arabinoside, whose toxicities limit their use to topical application and life-threatening infections. Generally, drug therapy has shown relatively little promise and the emphasis has been on preventative treatment, e.g., immunization. Usually palliative therapy and treatment with antibiotics to prevent secondary bacterial infection, are the only recourse after the disease symptoms of the viral infection have manifested themselves. Administration of interferon or interferon inducers and the rifampin series of antibiotics are not commercially feasible nor clinically warranted, respectively.

It has now been found that the adverse effects in mammals of virus infections can be minimized and/or their period of manifestation shortened according to the method of this invention. This is most important because the secondary effects, e.g., debilitation and resulting secondary bacterial infection, etc., are often serious sequelae of a viral infection. Thus, although the course of the viral infection, i.e., the period and rate of virus replication in the infected patient, is not necessarily always altered according to the method of this invention, the consequences of such infections are favorably influenced so that the overall clinical picture is improved.

OBJECTS OF THE INVENTION

It is an object of the invention to provide a method for symptomatically treating viral diseases in animals, including humans. Another object is the provision of such a process in which the patient is a mammal. Still another object is the provision of such a process for treating humans having an illness caused by such a viral infection. Other objects will be apparent to those skilled in the art to which this invention pertains.

SUMMARY OF THE INVENTION

According to this invention, the symptomatic effects of viral infections in animals are treated by the systemic administration of successive therapeutically effective amounts of orgotein to the infected animal.

DETAILED DISCUSSION

Orgotein defines a family of protein congeners having a characteristic combination of physical, chemical and pharmacological properties. Each of these congeners is characterized physically by being the isolated, substantially pure form of a globular, buffer and water-soluble protein having a highly compact native conformation which, although heat labile, is stable to heating for several minutes at 65° C. in water or a buffer solution containing a salt of a divalent metal having an ionic radius of 0.60 to 1.00 A. and which on gel electrophoresis at pH 8.45 in .01 M Trisglycine buffer gives a characteristic multiple-band pattern. Chemically, each is characterized by containing all or all but one of the essential amino acids, a small percentage of carbohydrate, no lipids, 0.1 to 1.0% metal content provided by about 3 to 5 gram atoms per mole of one or more chelated divalent metals having an ionic radius of 0.60 to 1.00 A., and substantially no chelated monovalent metals or cell poisons in the molecule. Pharmacodynamically, each of the congeners is characterized by being a non-toxic, immunilogically well-tolerated, injectable protein whose pharmacological activity includes anti-inflammatory activity which, like its compact conformation, is related to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

From recent literature data, it is now apparent that the orgotein family of metalloproteins includes the proteins previously isolated in various states of purity and given the names hepatocuprein, Mann & Keilin, Proc. Royal. Soc. for Biol. Sci., 126, 303 (1939); cerebrocuprein, Porter & Ainsworth, J. Neurochem., 1, 260 (1957); erythrocuprein, Markowitz et al., J. Biol. Chem., 234, 40 (1959); and cytocuprein, Carrico & Deutsch, J. Biol. Chem., 244, 6087 (1969). For other references, see Mohamed & Greenberg, J. Gen. Physiol., 37, 433 (1954); Porter & Folch, Arch. Neurol. Psychiat., 77, 8 (1957); Porter & Ainsworth, J. Neurochem., 5, 91 (1959); Krimmel et al., J. Biol. Chem., 234, 46 (1959); Wyman, Biochem. Biophys. Acta, 45, 387 (1960); Shields et al., J. Clin. Inv., 40, 2007 (1961); Markowitz et al., Anal. Chem., 33, 1594 (1961); Porter et al., Arch. Biochem. Bioph., 105, 319 (1964); Stansell & Deutsch, J. Biol. Chem., 240, 4299 (1965); ibid, 240, 4306 (1965); Stansell & Deutsch, Clin. Chem. Acta, 14, 598 (1966); McCord & Fridovich, J. Biol. Chem., 243, 5753 (1968); Hartz & Deutsch, J. Biol. Chem., 244, 4565 (1969); McCord & Fridovich, J. Biol. Chem., 243, 6056 (1968); Carrico & Deutsch, ibid, 245, 723 (1970). These metalloproteins have been reported to possess very high superoxide dismutase (sodase) activity. See McCord & Fridovich, J. Biol. Chem., 244, 6049 (1969); Keele, McCord and Fridovich, J. Biol. Chem., 245, 6176 (1970); ibid, 246, 2875 (1971).

The proven therapeutic effectiveness of orgotein may manifest itself in viral diseases by reducing inappropriate levels of host responses to allow a more effective response to the infection, whether phagocyte or interferon mediated. In addition, the suppression of side-reactions, e.g., inflammation, prevents the occlusion of body cavities which predispose to secondary infection, as in sinusitis and otitis. Orgotein thus differs from synthetic anti-inflammatory agents, which are contraindicated, in that it is neither immunosuppressive nor cytotoxic at recommended dose rates.

Orgotein can be isolated from red blood cells according to the method of U.S. 3,579,495. It can be isolated from liver and other tissues of a variety of animals, preferably bovine, according to the process of U.S. application Ser. No. 15,883, filed Mar. 2, 1970; Netherlands Pat. 66/14,177; Belgium Pat. 687,828; and British Pat. 1,160,151. A method for the production of pure orgotein is claimed in U.S. Pat. 3,624,251.

Sterile lyophilized pure orgotein is storable for at least one year at room temperature without detectable denaturation of the protein. Orgotein stabilized with certain saccharides, including sucrose, is claimed in U.S. 3,637,640.

The orgotein can be in admixture with one or more conventional pharmaceutical carriers or excipients, suitable for intravenous, subcutaneous or intramuscular injections, usually the latter, e.g., as an aqueous solution or aqueous suspensions using excipients and carriers conventional for this mode of administration. Usually an aqueous solution, preferably isotonic, is preferred for intramuscular injection.

As used herein, the term "pharmaceutical carrier" denotes a solid or liquid devoid of significant activity in treating viral infections and is composed of a single substance or a number of substances which may be solids, liquids or a combination of solids and liquids, each of which is substantially non-toxic in the amount used in the composition, as measured in the same animal host using the same method of administration, vehicle, etc. Orgotein compositions can, if desired, also contain other active substances, e.g., anti-bacterial and antibiotic agents such as, for example, the sulfa drugs and antibiotics, e.g., tetracycline, the penicillins, etc.

Compositions intended for oral use may be prepared according to any method known in the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the orgotein ingredient in admixture with non-toxic pharmaceutically acceptable excipients which are suitable for manufacture of tablets. These excipients may be, for example, inert diluents, for example calcium carbonate, sodium carbonate, lactose calcium phosphate or sodium phosphate; granulating and disintegrating agents, for example maize starch, or alginic acid; binding agents, for example starch, gelatin or acacia, and lubricating agents, for example magnesium stearate, stearic acid or talc. The tablets may be uncoated, but preferably are coated by known techniques to delay disintegration and absorption in the gastro-intestinal tract and to protect the orgotein from stomach acids.

Formulations for oral use may also be in the form of hard gelatin capsules wherein the orgotein is mixed with an inert solid diluent, for example calcium carbonate, calcium phosphate or kaolin, or as soft gelatin capsules wherein the active ingredient is mixed with an oil medium, for example arachis oil, liquid paraffin or olive oil.

Aqueous solutions usually contain the orgotein in admixture with excipients suitable for the manufacture of stable aqueous solutions, e.g., NaCl, to provide a saline or isotonic solution, buffer agents, acids or bases, etc. The aqueous solution can also contain one or more preservatives, for example ethyl or n-propyl p-hydroxybenzoate.

Oily suspensions may be formulated by suspending orgotein in an oil suitable for injection, topical or oral administration, in a vegetable oil, e.g., arachis oil, olive oil, sesame oil or coconut oil, or in a mineral oil, e.g., a liquid paraffin. The oily suspensions may contain a thickening agent, for example beeswax, hard paraffin or cetyl alcohol. These compositions may be preserved by the addition of an antioxidant, e.g., ascorbic acid.

The pharmaceutical compositions comprising orgotein can be in the form of oil-in-water emulsions suitable for oral or parenteral administration. The oily phase may be a vegetable oil, e.g., olive oil or arachis oils, or a mineral oil, e.g., liquid paraffin or mixtures of these. Suitable emulsifying agents are natural occurring gums, e.g., gum acacia or gum tragacanth, naturally occurring phosphatides, e.g., soya bean lecthecin and esters of partial esters derived from fatty acids and hexitol anhydrides, for example sorbitan monooleate, and condensation products of the said partial esters with ethylene oxide, for example polyoxyethylene sorbitan monooleate.

The compositions of this invention can be administered parenterally or orally. The term parenteral as used herein includes subcutaneous, intradermal, intravenous, intramuscular, intraocular, intrastroma, intrasynovial, intrathecal, intramural, intraarticular, intraperitoneal, intrascrotal, intraosseous, intraspinal, intraligamentous and intrasternal. Intramuscular and subcutaneous administration is usually preferred except when the orgotein is administered proximate a localized area of infection.

The pharmaceutical compositions can be in the form of a sterile injectable preparation, for example, as a sterile injectable aqueous solution. The solution can be formulated according to the known art using those carriers mentioned above. The sterile injectable preparation can also be a sterile injectable solution or suspension in a non-toxic parenterally acceptable diluent or solvent, e.g., 1,3-butanediol.

The pharmaceutical compositions combine an effective unit dosage amount of orgotein, i.e., the orgotein is present at a concentration effective to evoke the desired response when a unit dose of the composition is administered by the route appropriate for the particular pharmaceutical carrier. For example, liquid compositions, both topical and injectable, usually contain about 0.5 to 20 mg. of orgotein per 0.25 to 10 cc., preferably about 0.5 to 5 cc., except I.V. infusion solutions, which can also be more dilute, e.g., 0.5 to 20 mg. orgotein per 50–1,000 ml., preferably 100–500 ml. of infusion solution. Tablets, capsules and other vehicles adapted for oral administration usually contain 0.1 to 25 mg., preferably 1 to 10 mg., per unit.

Although the orgotein can be administered at any convenient site of the body, intramuscular or subcutaneous injections are preferred.

Orgotein is usually administered in multiple successive dosages, spaced as frequently as every six hours and as long as one week apart. Usually, doses every 6 to 12 hours are administered until relief from symptoms, e.g., pain, fever, swelling, erythema and others is obtained. Thereafter, doses spaced one to several days apart are administered until all symptoms of viral infection are gone. Daily doses are preferred. A subsequent dose or two may be given thereafter. The number of successively spaced doses of orgotein necessary in order to alleviate at least some of the symptoms associated with the viral infection will vary widely, depending on the nature and status of the infection. In some cases, clinical relief is obtained in a period of a few hours. Others require longer periods of therapy of from several days up to several weeks. Because symptomatic relief sometimes precedes complete elimination of the viral infection, care must be taken not to terminate orgotein therapy prematurely.

The amount of orgotein administered is dependent on several factors, including the species of animal being treated, the condition of the patient prior to orgotein therapy, the progression of the viral infection, and the particular manifestations of the viral infection with which the patient is suffering. The usual dosage range of orgotein is from about 0.5 mg. to 20 mg., usually 1 mg. to 5 mg. The dosage is not significantly dependent on the weight of the patient. For example, a usual dose for a (0.5–20 lbs.) cat is about 1 mg.; for a dog (5–55 lbs.), 2 mg.; and for a horse (1,000 lbs.) 5 mg.; every 6 to 24 hours. The dosage is more dependent upon the dynamics of the infection. With a severe infection, injections spaced about every six hours are required, with the frequency reduced to 8–12 hours and then every 24 hours or longer, depending on the clinical picture. Thus, during the acute stages of a viral infection, the frequency of the injections are more critical than the amount of each dose, above a minimum of about 1–5 mg.

The optimum dose of orgotein seems to be correlated with the amount of symptomatology present. Therefore, orgotein dose rates are appropriately considered in terms of mg. per kg. of involved tissue, regardless of the size of the animal.

Several hundred injections have been given into the same site intramuscularly and no gross or histological evidence of untoward reaction has been noted.

There is, however, an uncommon event that may occur. It involves the development of an increase in symptoms occurring after the first or second injection. If such an exacerbation develops, it is most likely that a clinical benefit or improvement will follow soon afterward.

The viral infections which are susceptible to orgotein therapy are those whose chief complaint, debilitating manifestation or life threatening aspect, is a complex of processes, e.g., encephalitis, conjunctivitis, enteritis, rhinitis, orchitis, pharyngitis, hepatitis, pneumonitis, stomatitis, dermatitis, vesiculitis, urethritis, cystitis, otitis, bronchitis, meningitis, keratitis, sinusitis, tonsilitis, epiglotitis, laryngitis, nephritis, pancreatitis, and osteitis. Such viruses are listed in Table I, viz., the adenoviruses, the herpesviruses, the myxoviruses, the poxviruses, the paramyxoviruses, the reoviruses, the picornaviruses and the arboviruses. Those diseases particularly receptive to orgotein therapy are infections caused by the herpes viruses (which includes fever blisters, shingles, mononucleosis in humans and corneal herpes-supra-arbital herpes), canine distemper, pneumorhinitis in horses, equine abortion, rinderpest, hoof and mouth disease, hepatitis in humans, panleukopenia in cats and genito urinary calculi of viral origin in cats. In each of the diseases listed in Table I, the orgotein therapy is substantially the same as that listed in the examples, the only variations being an appropriate increase in the amount of each dose in the larger animals, the frequency of administration in dosages, depending on whether the disease is in a critical, chronic or passive condition and the duration of the treatment, depending on the tenacity of the virus.

A preferred embodiment of this invention is the treatment of animals infected with the virus disease of canine distemper of the paramyxovirus family, a highly infectious catarrhal disease of dogs, foxes, mink, ferrets, wolf, coyote, raccoon, weasel, skunk and the dingo.

Symptoms of canine distemper generally appear on the fourth day after exposure. A watery discharge from the eyes and nose manifests the presence of the disease in addition to lassitude, inappetite and diphasic fever sometimes reaching as high as 105° F. Accompanying the precipitous rise in temperature the animal loses appetite and vomiting frequently occurs. The animal becomes a prime target for secondary bacterial infections such as pneumonia and bronchitis. Symptoms of nervous system involvement, e.g., muscular spasms and seizures, frequently occur as the disease progresses. Encephalitis and meningitis have occurred in some cases. U.S. Pat. 3,097,134 estimates the mortality rate in cases with catarrhal symptoms is 25%, but in many cases, the disease progresses to the nervous symptom state where the mortality rate is from 85% to 90%. Also, canine distemper causes the permanent disability of more young dogs than any other canine disease.

Another preferred embodiment of this invention is the treatment of diseases caused by the myxoviruses, especially those producing symptoms typical of the common cold and/or influenza, and most particularly diseases in humans, horses and dogs. Virus-induced diseases of particular importance in the method of this invention include viral pneumonia, herpes simplex and herpes zoster in humans, viral hepatitis and mononucleosis in humans and virus-induced panleukopenia and urinary calculi in cats.

All known viruses have a coating of either protein or protein-lipid substance. A nucleic acid resides inside the capsid (protein coat) which is responsible for the ability of the virus to reproduce. Nucleic acids (DNA or RNA) are present in virus usually in the form of ordered structures and often as double stranded helixes. This structural order is essential for the successful transcription and replication phases of infection.

In view of the above, there are several possible bases for the interaction of orgotein with viral replication. One possibility is an interaction of orgotein with viral DNA or RNA thus blocking or altering the transcription phase of replication (m-RNA). Orgotein interaction with DNA from various sources (calf thymus, salmon sperm, Cl. perfringens) has been demonstrated in vitro in the following systems: DNA-Dnase; anti-nuclear antibodies fluorescent test; fiber formation of DNA with cytochrome-C. Thus, interaction with viral DNA is definitely suggested. Viruses containing only RNA appear able to replicate directly from their RNA or through a DNA intermediate. Orgotein may interrupt the transcription process.

Still another possible mode of action is orgotein interference with induction and/or repression of enzyme synthesis and with it influence on feedback control. Support for this possibility is the fact there sometimes is a decrease of anti-inflammatory bioassay response upon increase of orgotein past optimal dose, i.e., the dose-response curve exhibits a peak followed by a descending limb.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

Examples I–III (Paramyxovirus)

Three animals infected with canine distemper were examined for gross symptoms of the disease. Following a positive clinical diagnosis in each case, orgotein was administered daily for at least seven days as a sterile solution stabilized with two times by weight of sucrose. The daily I.M. dose was maintained at 2 mg. throughout the observation period. A minimum of 7 days therapy was required to produce symptomatic results. In addition to orgotein supportive therapy was initiated with an injection of a mixture of antibiotics containing 200,000 units of penicillin and 250 mg. of dihydrostreptomycin. Data collected from the experiment is set forth in Table III.

TABLE III

| | 1 | 2 | 3 |
|---|---|---|---|
| Sex | Male | Male | Female. |
| Age (yrs.) | 1½ | 2 | 1. |
| Weight (lbs.) | 55 | 45 | 25. |
| Breed | German shepherd | German short hair mix | Cocker spaniel. |
| Clinical gross observations | Slight ocular discharge | Nasal and ocular discharge, reduced appetite. | Ocular discharge, good physical condition. |
| Diagnosis | Severe distemper | Severe distemper | Moderate distemper. |
| Orgotein dosage | 2 mg. I.M. daily for 7 days | 2 mg. I.M. daily for 15 days | 2 mg. I.M. daily for 11 days. |
| Supportive therapy | 1 cc. penicillin-streptomycin mixture. | 1 cc. penicillin-streptomycin mixture. | 1 cc. penicillin-streptomycin mixture. |
| Prognosis | Rapid recovery | Good gross clinical response | Complete recovery. |

Example IV (Paramyxovirus)

In Table IV below a summary of case histories of 25 cases of canine distemper which are typical of the results obtained when treating this disease with orgotein following the method described in the preceding examples, i.e., 2 mg. of orgotein, in 2 ml. of isotonic solution, per day for the duration of observation.

TABLE IV

| Patient | Sex | Age | Wt. (lbs.) | Clinical observations | Orgotein Dosage (mg.) | Duration (days) | Remarks |
|---|---|---|---|---|---|---|---|
| 1 | M | 5 months | 35 | Slight depression, conjunctivitis, inappetence. | 2 | 19 | Appeared normal after first day of therapy. |
| 2 | F | 11 months | 30 | Became ill after welping, all pups died | 2 | 11 | Fast recovery. |
| 3 | F | 6 months | 30 | Hard pad, chronic distemper of 6 weeks duration. | 2 | 6 | Not responsive to therapy, animal euthanized. |
| 4 | M | do | 40 | Occular and nasal discharge, inappetence | 2 | 5 | Rapid recovery indicates questionable diagnosis of distemper. |
| 5 | M | 7 months | 50 | Nasal discharge | 2 | 4 | Recovery and discharged, later relapses, untreated for 30 days. |
|  |  |  |  | Anorexia, dehydration, CNS symptoms | 2 | 17 | Case of long duration, no relief, animal euthanized. |
| 6 | M | 3 months | 30 | Congrested bronchial cough, thick purulent nasal and occular discharge. | 2 | 17 | Symptoms of pneumonia on 6th day, occular and nasal discharge ceased by 11th day, animal normal except for persistant cough. |
| 7 | M | 6 years | 15 | High temperature, bronchial congestion, clear nasal discharge. | 2 | 8 | Animal in good physical condition on admission, symptoms relieved. |
| 8 | M | 3 months | 30 | Purulent nasal and occular discharge, dyspnea, pneumonia of unknown duration. | 2 | 15 | Released, 7 days later developed encephalitis, euthanized. |
| 9 | M | 4 months | 40 | Congestive bronchitis, purulent nasal and occular discharge, ulcers in nares protruding, some hemorrhages. | 2 | 13 | Slight cough remaining at end of therapy. |
| 10 | F | do | 10 | Occular discharge, deep bronchial cough, poorly nourished animal, fever, andrexia. | 2 | 12 | Discharge and bronchitis gone on 7th day, fever remained elevated, euthanized. |
| 11 | F | 5 months | 10 | Purulent nasal discharge, coughing, poor state of nutrition, a well-established case in a debilitated animal. | 2 | 12 | Slight nasal discharge and cough remain. |
| 12 | M | 12 weeks | 15 | Nasal discharge, poor nourishment, severe case. | 2 | 14 | Animal appeared to be fully recovered, relapse of sumptoms. |
|  |  |  |  | Returned for treatment, anorexia and high temperature. | 0 | 0 | No treatment for 18 days, released. |
|  |  |  |  | Poor physical condition | 2 | 17 | Bronchial cough on the 10th day, treatment on the 17th day stopped. |
| 13 | M | 10 weeks | 10 | Placed in boarding kennel for observation for 9 days. | 0 | 0 | No relapse of symptoms occurred, slight cough. |
| 14 | M | 3 months | 15 | Occular and nasal discharge, deep bronchial cough, tonsilitis, good physical condition. | 2 | 12 | Released with slight cough after 14 days without medication. |
| 15 | F | 4 months | 15 | Cough, temperature, fair physical condition. | 2 | 10 | Ful recovery. |
| 16 | F | do | 20 | Distemper, thin, massive tapeworm infection. | 2 | 17 | Rapid resolution of symptoms, full recovery. |
| 17 | F | 5 months | 15 | Congestive bronchitis, purulent rhinitis | 2 | 11 | Dog was normal in 7 days. Housed with other dogs having various degrees of distemper and coughing, no recurrence of symptoms. |
| 18 | M | 10 weeks | 8 | Severe distemper, poor physical condition, infested with worms. | 2 | 15 | Severe cough developed, returned to owner with an unfavorable prognosis. |
| 19 | M | do | 20 | Anorexia, mucopurulent and occular discharge, high fever. | 2 | 18 | Temperature normal, nasal discharge reduced. |
| 20 | M | 1½ years | 55 | Slight nasal and occular discharge, good physical condition. | 2 | 7 | Mature dog, rapid recovery. |
| 21 | M | 2 years | 45 | Severe distemper | 2 | 11 | Good clinical response for an older dog, temperature reached normal range on day 11. |
| 22 | F | 1 year | 25 | Occular discharge, good physical condition | 2 | 11 | Rapid recovery. |
| 23 | F | 4 months | 5 | Severe occular discharge | 2 | 15 | Placed in close contact with other distemper cases; during therapy animal developed tracheobronchitis (kennel cough) on day 6, treated with antitussive and released on day 15 as recovered. |
| 24 | M | 8 weeks | 10 | Presented for treatment as ill | 2 | 4 | Animal did not develop distemper symptoms |
| 25 | M | 3 months | 25 | Healthy animal placed in contact with distemper cases during therapy. | 2 | 22 | Dog had elevated temperature on the 10th day which returned to normal. Dog discharged as recovered. |

Example V (Herpesvirus)

Horses selected from race track population of thoroughbreds and standard breeds were diagnosed to have a chronic cough of nasal and occular discharge caused by the upper respiratory infection of equine rhinopneumonitis of several weeks duration. None of the subjects responded to previous antibiotic therapy. Each horse was examined by a veterinarian who recorded the therapeutic effects of the course of treatment with orgotein.

Orgotein in 5% dextrose was administered intramuscularly in 2 cc. and 7 cc. volumes containing 0.2 mg. of orgotein per milliliter of solution. From 5 to as many as 15 injections were given to each horse, depending on the condition of the animal.

TABLE V.—EVALUATION OF THERAPEUTIC EFFECTS OF ORGOTEIN IN TREATMENT OF HORSE RHINOPNEUMONITIS (Herpesvirus)

| Horse | Injections | | Days until cough ended | Body temperature | | Comments |
|---|---|---|---|---|---|---|
|  | Number | Vol. (m.) |  | Initial | Final |  |
| 1 | 5 | 2 | 5 | 100 | 100 | Pharyngitis, infrequent cough, general improvement, eyes clear. |
| 2 | 5 | 2 | 5 | 104 | 101 | Pleuritis, moribund terminal, animal recovers, sent to farm. |
| 3 | 5 | 2 | ⅔ | 100 | 100 | Cough and secretion disappears. |
| 4 | 5 | 2 | 5 | 104 | 101 | Abscess of lymph gland, animal recovers rapidly. |
| 5 | 3 | 2 | 3 | 100 | 100 | Terminated bleeding from nose. |
| 6 | 5 | 2 | ⅔ | 100 | 100 | Adenopathy. |
| 7 | 5 | 2 | 3 | 101 | 100 | Adenopathy—complete recovery. |
| 8 | 15 | 7 | 5 | 102 | 100 | Respiratory embarrassment reversed, cough ceases. |
| 9 | 10 | 7 | ½ | 100 | 100 | Cough gone, discharge disappears, complete recovery. |
| 10 | 14 | 7 | 10-12 | 100 | 100 | Decrease in discharge, respiration improved. |
| 11 | 6 | 7 | 4 | 100 | 100 | Discharge disappears, breathing normal. |
| 12 | 6 | 7 | 6 | 103 | 100 | Cough and discharge disappears. |
| 13 | 7 | 7 | ½ | 101 | 100 | Cough disappears, nasal occular discharge gone, complete recovery. |
| 14 | 6 | 7 | ⅚ | 102 | 100 | Coughing continues, discharge gone. |
| 15 | 7 | 7 | 3 | 100 | 100 | Cough ceases, nasal discharge disappears, breathing improved, complete recovery. |

The effects observed are reflected in Table III. In most cases the characteristic cough and discharge of equine rhinopneumonitis was either reduced or disappeared within a period of five injections. Lymphadenopathy usually associated with resporatory infections was also ameliorated in the horses. In most of the animals increased motor activity and spirit, reversal of anorexia and increase in fluid intake was observed.

Administration of orgotein to horses infected with the upper respiratory infection of equine rhinopneumonitis resulted in amelioration relief and recovery of cough and discharge produced by the virus.

Example VI (Herpesvirus)

20 of 25 San Francisco police horses with virus pneumorhinitis were injected intramuscularly with 0.5 mg. of the mixed metal orgotein chelate in 3 ml. sterile, isotonic saline solution. The condition of the controls was unchanged. All but one of the injected horses had a quick and complete recovery. That horse was given another 2.5 mg. injection. Improvement was dramatic. Temperature returned from 104° to normal within 24 hours. The condition of another ten horses was similarly improved with injections of from 0.16 to 1.00 mg. of the protein product. The coughing stopped in as short a time as 1½ hours. The size of the dose did not appear critical.

Example VII (Herpesvirus)

Of fourteen race horses having respiratory tract virus infections of two weeks to three months standing and whose symptoms included engorged sinuses, difficulty in breathing, frequent severe cough, fever, swollen lymph glands and heavy discharge of bloody mucous from the nasal passages, eleven were treated by intramuscular injection with orgotein by the process of this invention at doses ranging from 0.4 to 1.4 mg. per injection. Vehicle was 5% dextrose, 1 ml. per 0.2 mg. protein. Treatment varied from 4 to 9 injections spread over 10–15 days. As controls, the other three horses were given placebo injections of the 5% dextrose only.

After the treatment, none of the three control horses showed any improvement. The other eleven had a quick and complete recovery and were returned to racing.

Example VIII (Herpesvirus)

A human patient with mononucleosis was treated successfully with 1 mg. orgotein b.i.d. for 2 days with disappearance of cervical lymphadenopathy and tenderness, as well as sore throat, weakness and fever. The patient remained ambulatory and was able to continue his concentrated college course at the university.

Example IX (Herpesvirus)

Human patients with shingles and thoracic neuralgia, supraorbital neuritis and neuralgia, as well as corneal herpetic lesions have been successfully treated and responded satisfactorily to 2 mg. intramuscular injections of orgotein daily for 2 to 7 days.

Example X (Myxovirus)

Human subjects with Asian and Hong Kong Influenza benefited clinically from 2 mg. orgotein subcut. 6–24 hours for 2 to 7 days.

Example XI (Reovirus)

Human subjects with gastro enteritis (intestinal flu) responded beneficially in 24–28 hours following intramuscular injections of 2 mg. of orgotein twice daily.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for the symptomatic treatment of a viral infection in an animal which comprises administering systemically to the infected animal successive therapeutically effective doses of orgotein.
2. A method of claim 1 wherein the orgotein is administered intramuscularly.
3. A method of claim 1 wherein the orgotein is administered subcutaneously.
4. A method of claim 1 wherein the animal is a mammal infected with a paramyxovirus.
5. A method of claim 4 wherein the animal is a canine infected with canine distemper virus.
6. A method of claim 1 wherein the animal is infected with myxovirus.
7. A method of claim 1 wherein the effect to be ameliorated is pneumorhinitis.
8. A method of claim 1 wherein the effect to be ameliorated is enteritis.
9. A method of claim 1 wherein the effect to be ameliorated is dermatitis.
10. A method of claim 1 wherein the effect to be ameliorated is tracheobronchitis.
11. A method of claim 1 wherein the effect to be ameliorated is stomatitis.
12. A method of claim 1 wherein from 0.5 to 20 mg. of orgotein is administered per dose.
13. A method of claim 12 wherein the orgotein is administered in a succession of spaced doses at effective intervals of from about six hours to one week until the symptoms of the viral infection are gone.
14. A method of claim 1 wherein from 1 to 5 mg. of orgotein is administered per dose.
15. A method of claim 14 wherein the orgotein is administered in a succession of spaced doses at effective intervals of from about six hours to one week until the symptoms of the viral infection are gone.
16. A method of claim 15 wherein the animal is a mammal infected with an influenza virus.
17. A method of claim 15 wherein the animal is a mammal infected with a herpesvirus.
18. A method of claim 15 wherein the animal is a mammal infected with an arbovirus.

No references cited.

RICHARD L. HUFF, Primary Examiner